United States Patent [19]
Balfour et al.

[11] Patent Number: 5,953,869
[45] Date of Patent: Sep. 21, 1999

[54] FRAMING SYSTEM FOR FLUSH MOUNTING OBJECTS TO A ROOF AND METHOD THEREFOR

[75] Inventors: John R. Balfour, Phoenix; Charles F. Wood, Peoria, both of Ariz.

[73] Assignee: Sun Systems, Inc., Scottsdale, Ariz.

[21] Appl. No.: 08/948,407

[22] Filed: Oct. 10, 1997

[51] Int. Cl.⁶ .............................. E04D 13/18; E04B 7/18
[52] U.S. Cl. .................................... 52/200; 52/72; 52/58; 52/173.3
[58] Field of Search ................................ 52/200, 58–62, 52/199, 209, 72, 244, 173.3

[56] References Cited

U.S. PATENT DOCUMENTS

| | | | |
|---|---|---|---|
| 3,983,669 | 10/1976 | Bogaert | 52/200 |
| 4,570,393 | 2/1986 | Minter | 52/200 X |
| 4,941,300 | 7/1990 | Lyons, Jr. | 52/200 X |
| 5,094,040 | 3/1992 | Bunka | 52/200 X |
| 5,323,576 | 6/1994 | Gumpert et al. | 52/200 |
| 5,357,720 | 10/1994 | O'Keeffe et al. | 52/58 |
| 5,409,266 | 4/1995 | Baker | 52/60 X |
| 5,553,425 | 9/1996 | Sampson et al. | 52/200 X |

FOREIGN PATENT DOCUMENTS

| | | | |
|---|---|---|---|
| 689527 | 6/1964 | Canada | 52/200 |
| 2142733 | 7/1978 | Germany | 52/200 |

*Primary Examiner*—Carl D. Friedman
*Assistant Examiner*—Winnie S. Yip
*Attorney, Agent, or Firm*—Harry M. Weiss; Jeffrey Weiss; Paul W. Davis

[57] ABSTRACT

A system for flush mounting an object like a solar panel to a roof. The system uses a frame which is coupled to an outer circumference of the object. The frame is used to support and hold the object flush to the roof. An overhang member is coupled to an outside section of the frame. The overhang member is used for supporting roof flashing which is placed under the overhang member. This allows the object to be directly flashed to the roof flashing and further prevents water from seeping in between the object to be flush mounted and the roof flashing.

22 Claims, 3 Drawing Sheets

FRAMING SYSTEM FOR FLUSH MOUNTING OBJECTS TO A ROOF AND METHOD THEREFOR

BACKGROUND OF THE INVENTION

1. Field of the Invention

This invention relates generally to frames, and more specifically, to a framing system for flush mounting objects, specifically solar panels, to a roof and which prevents water from seeping in between the object and the roof sheathing.

2. Background of the Invention

Presently, in order to install objects such as solar panels on a roof, metal tubing is screwed onto the roof to support the solar panels at a specified angle. This conventional method of installing solar panels can be extremely unsightly with bulky collectors tilted upright and expose plumbing marring roof lines. Because of the unaesthetically pleasing look of conventionally installed solar panels, many new home owner associations have restricted and/or banned the installation of solar panels using conventional techniques. Furthermore, in order to install solar panels using conventional techniques, holes are drilled into the roof in order to hold and support the metal tubing. This causes problems since if the holes are not properly drilled and sealed, water will begin to seep into the home.

Therefore, a need existed to proved an improved system and method for mounting objects like solar panels onto a roof. The improved system and method will allow solar panels to be flush mount on the roof such that the solar panel will look like a high quality skylight. The improved system and method will allow solar panels to be flush mounted on the roof and also prevent water seepage into the home. The improved system and method will directly flash the solar panel and flashing panel on the roof sheathing thereby eliminating water from seeping in between the solar collector and the roof flashing. Using this flashing will allow any water that could form in the solar collector to run onto the roof tile through vent holes in the lower side of the flashing curb.

SUMMARY OF THE INVENTION

In accordance with one embodiment of the present invention, it is an object of the present invention to provide an improved system and method for mounting objects like solar panels onto a roof.

It is another object of the present invention to provide an improved system and method for flush mounting objects like solar panels on a roof.

It is still another object of the present invention to provide an improved system and method which will allow solar panels to be flush mounted on a roof and also prevent water from seeping into the home.

It is still another object of the present invention to provide an improved system and method which will allow solar panels to be flashed directly on the roof sheathing thereby eliminating water from seeping in between the solar collector and the roof flashing.

It is still a further object of the present invention to provide an improved system and method for flush mounting solar panels to a roof and which will allow any water that may enter the solar collector through glass breakage or leaking tubes to not enter the establishment where the solar panel is mounted.

It is yet a further object of the present invention to provide a roofer with a convenient method of flashing to make the roof water tight below the solar panel.

BRIEF DESCRIPTION OF THE PREFERRED EMBODIMENTS

In accordance with one embodiment of the present invention, a system for flush mounting an object to a roof is disclosed. The system uses a frame which is coupled to an outer circumference of the object to be flush mounted to the roof. The frame is used for supporting the object on the roof. An overhang member is coupled to an outside section of the frame. The overhang member is used for shielding the flashing curb so that water will not enter the flash pan and enter the establishment where the system is mounted and for preventing water from seeping in between the object to be flush mounted on the roof and the roof flashing.

In accordance with another embodiment of the present invention, a method of providing a system for flush mounting an object to a roof is disclosed. The method comprises the steps of: providing a frame coupled to an outer circumference of the object for supporting the object on the roof; and providing an overhang member coupled to an outside section of the frame for shielding the flashing curb so that water will not enter the flashing pan and enter the establishment where the system is mounted and for preventing water from seeping in between the object to be flush mounted on the roof and the roof flashing.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENTS

Figure 2:
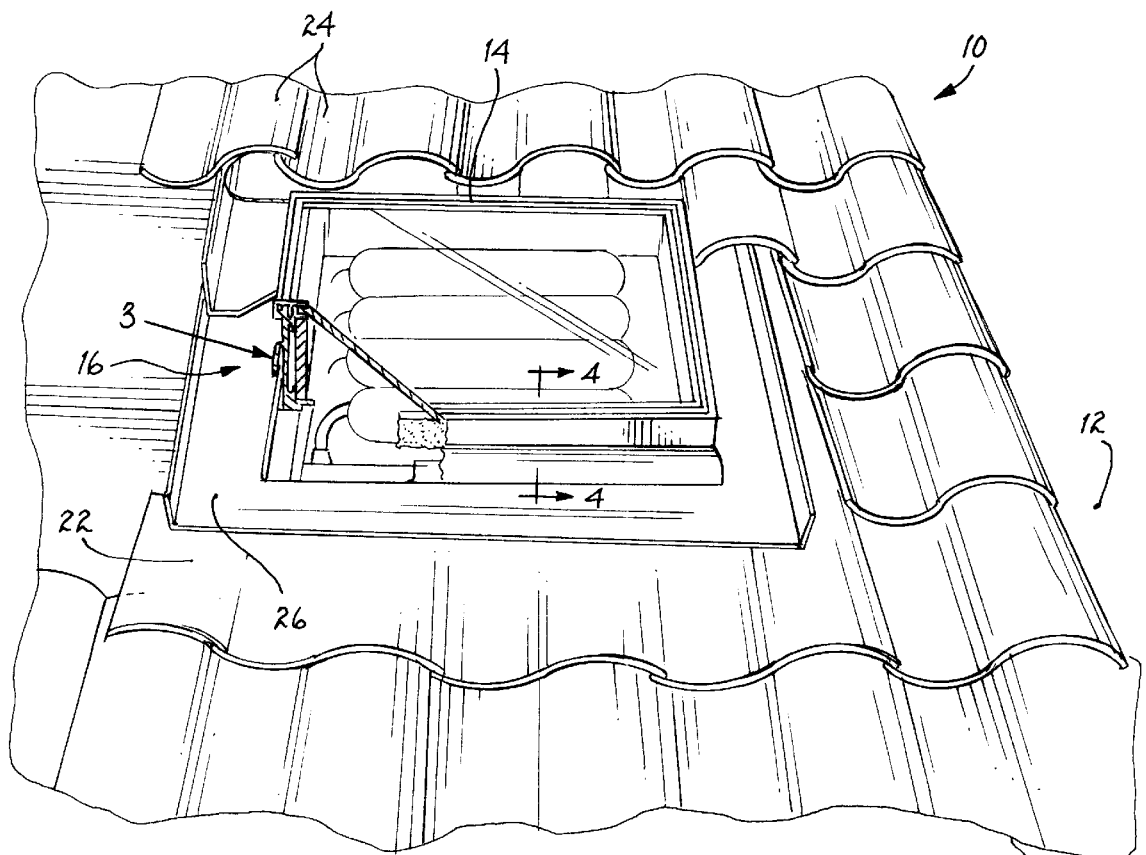
FIG. 2 is an elevated perspective view of the system depicted in FIG. 1 flush mounting a solar panel to a roof.
Figure 1:
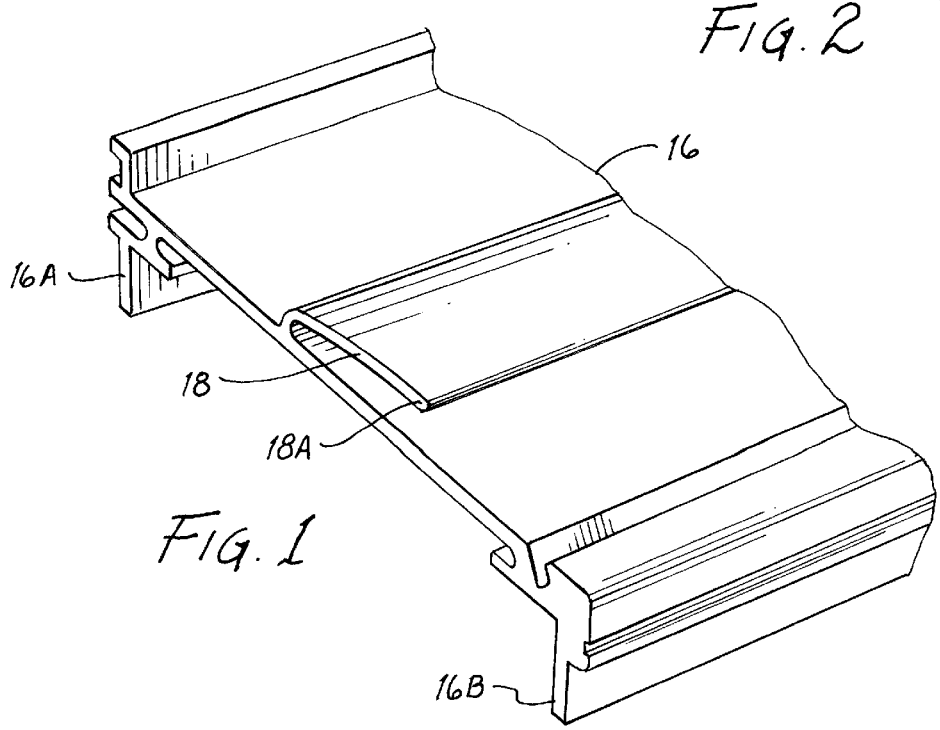
FIG. 1 is a cut away view of the system for flush mounting an object to a roof.
Figure 3:
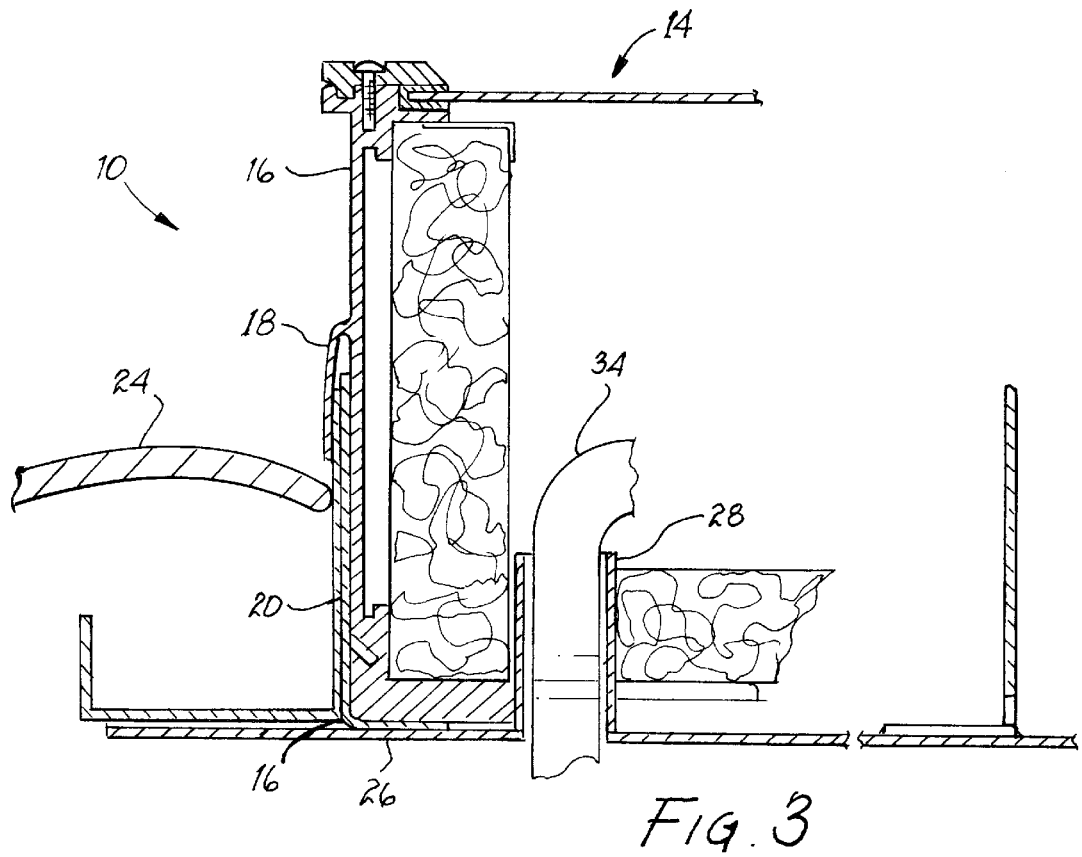
FIG. 3 is a cross-sectional side view of the system of FIG. 2 taken along line 3.
Figure 4:
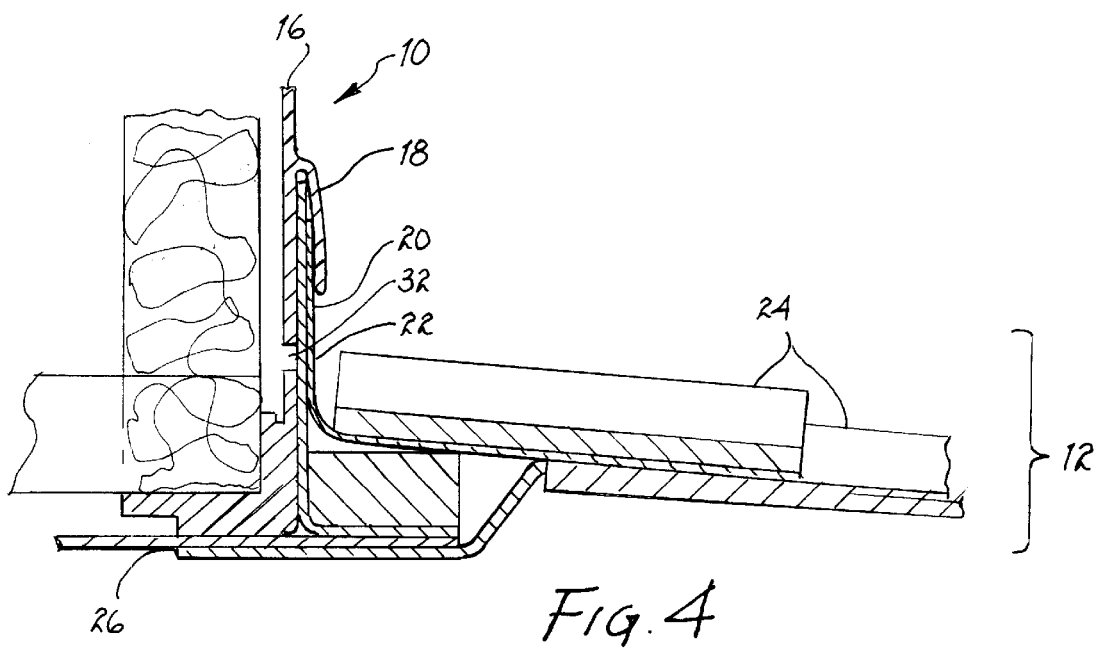
FIG. 4 is a cross-sectional side view of the system of FIG. 2 taken along line 4—4.
Figure 5:
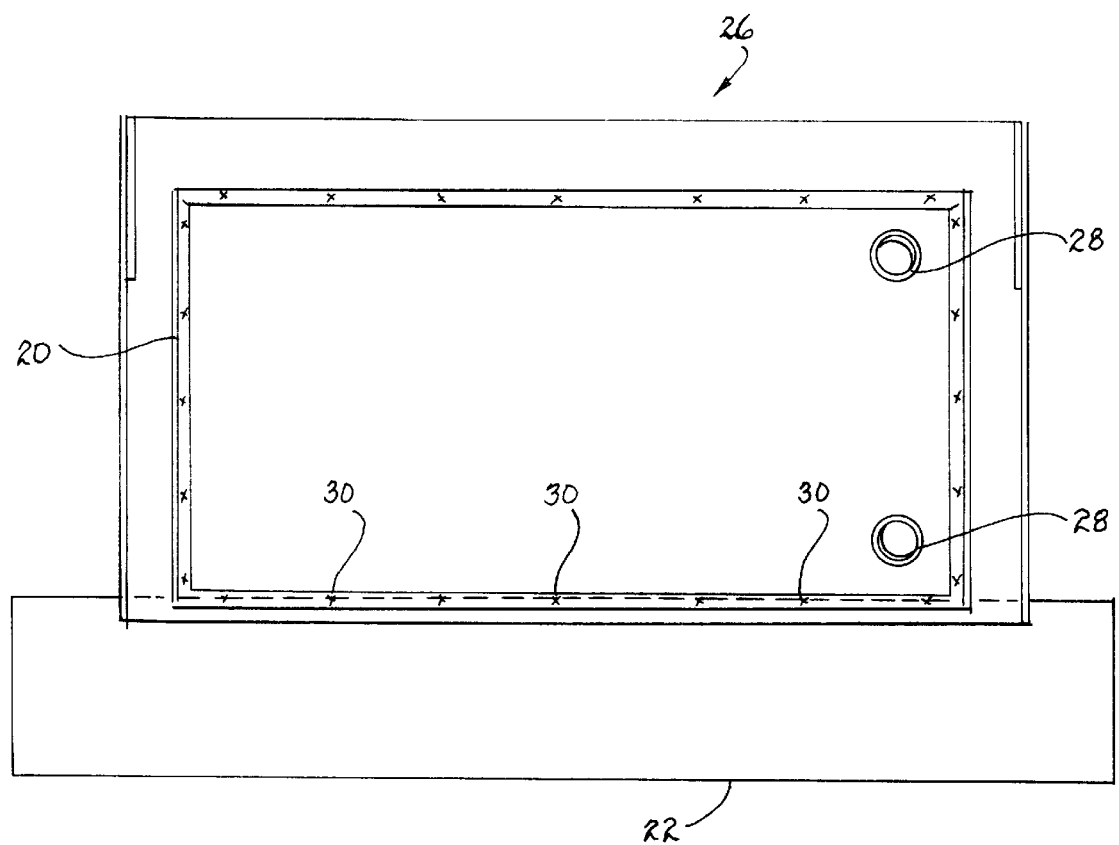
FIG. 5 is a top elevated perspective view of the water collection pan used in the system depicted in FIG. 1.

Referring to FIGS. 1–4, a system 10 for flush mounting an object to a roof 12 is disclosed. In the preferred embodiment of the present invention, the system 10 is used for flush mounting a solar absorber panel 14 to the roof 12.

The system 10 uses a frame 16 for supporting the solar panel 14. The frame 16 will have a top inside edge 16A and a bottom inside edge 16B. The top and bottom inside edges 16A and 16B respectively are used for supporting and holding the object (i.e., solar panel 14) to be flush mounted on the roof 12. In the preferred embodiment of the present invention, the frame 16 is placed around the entire outer circumference of the solar panel 14 and is made out of a strong light weight material like aluminum, sheet metal, or a plastic.

The frame 16 will have an overhang member 18 which is permanently coupled to the frame 16. The overhang member 18 generally takes the shape of an "L" member or that of a sweeping wing. The overhang member 18 will extend along the entire length of the frame 16. When installing the solar panel 14, the roof flashing 20 will be placed under the overhang member 18. Thus, the overhang member 18 will allow the solar panel 14 to be mounted directly on the roof flashing 20 thereby eliminating water from seeping in between the roof flashing and the solar panel 14.

In the preferred embodiment of the present invention, the bottom tip 18A of the overhang member 18 begins approximately 2.25 inches to 3.00 inches above the bottom of the frame 16. Furthermore, in the preferred embodiment of the present invention, the overhang member 18 will have a gap of approximately 0.2 to 0.5 inches from the outside of the bottom tip 18A of the overhang member 18 to the frame 16.

A bottom plate may be coupled to the roof flashing 20 to form a pan 26. The bottom pan section 26 is used to collect moisture which may have formed within the solar panel 14 and is discharged through openings 32 drilled through the frame 16. The bottom pan section 26 will have stand pipes 28 coupled thereto. The water feed and return lines 34 of the solar panel 14 are each placed inside a separate stand pipe 28. The stand pipes 28 are of a sufficient height to ensure that water in the bottom pan section 26 will not flow over the top of the stand pipes 28 and into the establishment where the system 10 is installed. In the preferred embodiment of the present invention, the stand pipes are approximately two and a half inches high.

To prevent water from building up in the bottom pan section 26, a plurality of drain holes 30 are drilled therethrough. The drain holes 30 will allow moisture which has collected in the bottom pan section 26 to be discharged onto the roof 12 thereby preventing water buildup in the bottom pan section 26.

As stated above, when installing the system 10, the roof flashing 20 will be placed under the overhang member 18 of the frame 16. The overhang member 18 will allow the solar panel 14 to be flashed directly on the roof flashing 20 and also eliminate water from seeping in between the roof flashing 20 and the solar panel 14. However, to further protect against water seepage into the home, a moldable metal sheet 22 may be used. The moldable metal sheet 22 is placed under the roof flashing 20 and is molded to conform to the roof tiles 24. A second layer of roof tiles 24 is then placed over the moldable metal sheet 22 in order to hide the moldable metal sheet 22. The moldable metal sheet 22 will prevent water from seeping in between the solar panel 14 to be flush mounted and the roof sheathing.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for flush mounting a solar panel to a roof comprising, in combination:
    a solar panel;
    a frame coupled to an outer circumference of said solar panel for supporting said solar panel on said roof;
    an overhang member coupled to an outside section (of said frame for supporting a roof sheathing placed under said overhang member and for preventing water from seeping in between said solar panel and said roof sheathing; and
    a bottom pan section located below both of said frame and said solar panel substantially between said solar panel and said roof and coupled to said frame for collecting moisture which may have formed inside said solar panel such that said water and light will not enter an establishment where said system is mounted.

2. A system for flush mounting a solar panel to a roof in accordance with claim 1 wherein said frame further comprises:
    a bottom edge member coupled to said frame for supporting said solar panel to be flush mounted; and
    a top edge member coupled to a top inside section of said frame for supporting said solar panel to be flush mounted.

3. A system for flush mounting a solar panel to a roof in accordance with claim 1 wherein a bottom section of said overhang member begins approximately 2.5 inches above a bottom section of said frame.

4. A system for flush mounting a solar panel to a roof in accordance with claim 1 wherein a bottom section of said overhang member has a gap of approximately 0.5 inches between said frame and said bottom section of said overhang member.

5. A system for flush mounting a solar panel to a roof in accordance with claim 2 wherein said bottom pan section has a plurality of holes drilled therethrough to allow said moisture which has collected in said bottom pan section to be discharged.

6. A system for flush mounting an solar panel to a roof in accordance with claim 2 wherein said bottom pan section further has stand pipes coupled thereto for allowing water feed and return lines to enter and exit said solar panel to be mounted.

7. A system for flush mounting a solar panel to a roof in accordance with claim 6 wherein said stand pipes are of a sufficient height to ensure that water collecting in said bottom pan section will not flow over a top of said stand pipes and into said establishment where said system is installed.

8. A system for flush mounting a solar panel to a roof in accordance with claim 1 further comprising moldable metal sheets placed over said roof sheathing and which conform to roofing tiles for preventing water seepage in between said solar panel to be flush mounted and said roof sheathing.

9. A system for flush mounting a solar panel to a roof comprising, in combination:
    a solar panel;
    a frame coupled to an outer circumference of said solar panel and having a bottom inside edge member and a top inside edge member for supporting said solar panel on said roof;
    an overhang member coupled to an outside section of said frame for supporting a roof sheathing placed under said overhang member and for preventing water from seeping in between said solar panel and said roof sheathing;
    a bottom pan section located below both of said frame and said solar panel substantially between said solar panel and said roof and coupled to said frame for collecting moisture which may have formed inside said solar panel such that said water and light will not enter an establishment where said system is mounted; and
    moldable metal sheets placed over said roof sheathing and which conform to roofing tiles for preventing water seepage in between said solar panel and said roof sheathing.

10. A system for flush mounting a solar panel to a roof in accordance with claim 9 wherein a bottom section of said overhang member begins approximately 2.5 inches above a bottom section of said frame.

11. A system for flush mounting a solar panel to a roof in accordance with claim 9 wherein a bottom section of said overhang member has a gap of approximately 0.5 inches between said frame and said bottom section of said overhang member.

12. A system for flush mounting a solar panel to a roof in accordance with claim 9 wherein said bottom pan section has a plurality of holes drilled therethrough to allow said moisture which has collected in said bottom pan section to be discharged.

13. A system for flush mounting an solar panel to a roof in accordance with claim 9 wherein said bottom pan section further has stand pipes coupled thereto for allowing water feed and return lines to enter and exit said solar panel to be mounted.

14. A system for flush mounting a solar panel to a roof in accordance with claim 13 wherein said stand pipes are of a sufficient height to ensure that water collecting in said bottom pan section will not flow over a top of said stand pipes and into said establishment where said system is installed.

15. A method for providing a system for flush mounting a solar panel to a roof comprising the steps of:

providing a solar panel;

providing a frame coupled to an outer circumference of said solar panel for supporting said solar panel on said roof;

providing an overhang member coupled to an outside section of said frame for supporting roof sheathing placed under said overhang member and for preventing water from seeping in between said solar panel and said roof sheathing; and providing a bottom pan section located below both of said frame and said solar panel substantially between said solar panel and said roof and coupled to said frame for collecting moisture which may have formed inside said solar panel such that said water and light will not enter an establishment where said system is mounted.

16. The method of claim 15 wherein said step of providing said frame further comprises the steps of:

providing a bottom edge member coupled to said frame for supporting said solar panel to be flush mounted; and providing a top edge member coupled to a top inside section of said frame for supporting said solar panel to be flush mounted.

17. The method of claim 15 wherein said step of providing an overhang member further comprises the step of providing an overhang member having a bottom section which begins approximately 2.5 inches above a bottom section of said frame.

18. The method of claim 15 wherein said step of providing an overhang member further comprises the step of providing an overhang member having a bottom section which has a gap of approximately 0.5 inches between said frame and said bottom section of said overhang member.

19. The method of claim 15 further comprising the step of providing moldable metal sheets placed over said roof sheathing and which conform to roofing tiles for preventing water seepage in between said solar panel to be flush mounted and said roof sheathing.

20. The method of claim 15 wherein said step of providing said bottom pan section further comprises the step of providing said bottom pan section having a plurality of holes drilled therethrough to allow said moisture which has collected in said bottom pan section to be discharged.

21. The method of claim 15 wherein said bottom pan section further has stand pipes coupled thereto for allowing water feed and return lines to enter and exit said solar panel to be mounted.

22. The method of claim 21 wherein said stand pipes are of a sufficient height to ensure that water collecting in said bottom pan section will not flow over a top of said stand pipes and into said establishment where said system is installed.

* * * * *